L. C. ROBERTS.
Cultivator.

No. 161,157.

Patented March 23, 1875.

WITNESSES
S. A. Cantwell
Ansel Stevens

INVENTOR
Leonard C. Roberts

THE GRAPHIC CO.PHOTO-LITH.39 & 41 PARK PLACE, N.Y.

UNITED STATES PATENT OFFICE.

LEONARD C. ROBERTS, OF GORHAM, MAINE.

IMPROVEMENT IN CULTIVATORS.

Specification forming part of Letters Patent No. 161,157, dated March 23, 1875; application filed August 1, 1874.

*To all whom it may concern:*

Be it known that I, LEONARD C. ROBERTS, of Gorham, in the county of Cumberland and State of Maine, have invented a new and useful Improved Cultivator; and hereby declare the following to be a full, clear, and exact description of the same, reference being had to the accompanying drawing, which is hereby made a part of the specification, in which—

Figure 1:
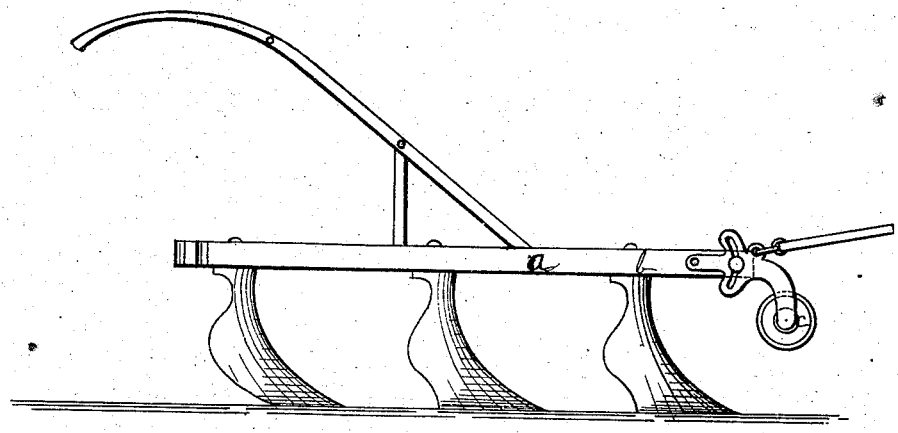
Figure 2:
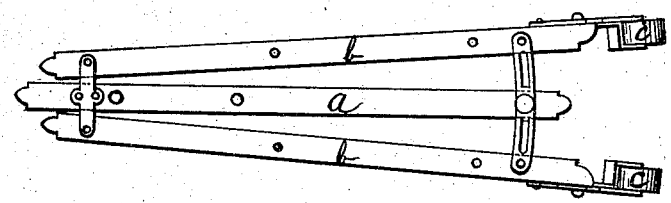

The Figures 1 and 2 are views of my device, showing the manner of its construction.

Same letters show like parts.

The object of my invention is to produce a one-horse cultivator that will not clog, that will thoroughly pulverize the soil, and can be adjusted with the wheels so that the outside front teeth can be run very shoal near the hills in the rows, so as not to disturb the roots. The back teeth can be run at any desirable depth, and at the same time work the soil out from the center and help to form the hills.

I am aware that many one-horse cultivators have been invented, but in most of them the frame has been used the narrow end forward, instead of the broad end forward, as I propose to use it.

My invention consists of a common cultivator-frame, $a$, with the broad end forward, the outside beams $b$ $b$ being provided with wheels $c$ $c$. At the forward ends, and so arranged that they can be adjusted so as to allow the teeth to run shoal or deep in the soil, the beams $b$ $b$ are also provided with a suitable device at the forward ends to attach the whiffletree.

What I claim as my invention, which I desire to secure by Letters Patent, is—

The outer beams, pivoted at the rear ends and made laterally adjustable in front, in combination with an adjustable gage-wheel on each, as shown and described.

LEONARD C. ROBERTS.

Witnesses:
 ANSEL STEVENS,
 JOHN O. WINSHIP.